(12) United States Patent
Dickey

(10) Patent No.: US 8,714,420 B2
(45) Date of Patent: May 6, 2014

(54) STRINGER SPIKE SHEATH

(76) Inventor: Michael William Dickey, Spring, TX (US)

( * ) Notice: Subject to any disclaimer, the term of this patent is extended or adjusted under 35 U.S.C. 154(b) by 131 days.

(21) Appl. No.: 13/539,305

(22) Filed: Jun. 30, 2012

(65) Prior Publication Data

US 2013/0000179 A1   Jan. 3, 2013

(51) Int. Cl.
  *A01K 65/00*   (2006.01)
(52) U.S. Cl.
  USPC ......................................... 224/103
(58) Field of Classification Search
  USPC ....... 224/103; 43/54.1, 55; 248/72; 24/706.8, 24/136 A
  See application file for complete search history.

(56) References Cited

U.S. PATENT DOCUMENTS

| | | | | |
|---|---|---|---|---|
| 1,089,755 A * | 3/1914 | Fischer | ..................... | 24/706.8 |
| 1,348,666 A * | 8/1920 | Schuler | .......................... | 24/635 |
| 1,492,853 A * | 5/1924 | Johnson | ...................... | 24/706.8 |
| 1,829,760 A * | 11/1931 | Santiago | .................... | 294/86.22 |
| 2,453,381 A * | 11/1948 | Orton | ............................ | 224/103 |
| 2,563,480 A * | 8/1951 | Montgomery | ................ | 224/103 |
| 2,564,389 A | 8/1951 | Boehm | | |
| 2,950,888 A * | 8/1960 | Cottrill et al. | ................. | 248/540 |
| 3,052,002 A | 9/1962 | Lesher | | |
| 3,191,827 A | 6/1965 | Tofts | | |
| 3,332,121 A | 7/1967 | Curtis | | |
| 3,540,637 A | 11/1970 | Ezell | | |
| 3,806,860 A | 4/1974 | Flammini | | |
| 3,854,638 A | 12/1974 | Anderson | | |
| 4,195,391 A * | 4/1980 | Anderson | ................... | 24/706.8 |
| 4,453,292 A | 6/1984 | Bakker | | |
| 4,570,836 A * | 2/1986 | Mayo | ............................ | 224/103 |
| 4,830,244 A * | 5/1989 | Brannon | ...................... | 224/103 |
| 4,960,231 A | 10/1990 | Popovich | | |
| 4,976,382 A | 12/1990 | Carpenter | | |
| 5,025,587 A * | 6/1991 | Creed | ................................. | 43/55 |
| 5,078,310 A * | 1/1992 | Ferry | ............................ | 224/103 |
| 5,114,058 A | 5/1992 | Davis | | |
| 5,203,480 A * | 4/1993 | Day et al. | ...................... | 224/103 |
| 5,359,870 A * | 11/1994 | Reutlinger | ................. | 70/456 R |
| 5,417,400 A * | 5/1995 | Arakawa | ....................... | 248/323 |
| 7,073,828 B2 * | 7/2006 | Foigel et al. | ................. | 292/315 |
| 7,357,282 B2 * | 4/2008 | Brull | ............................ | 224/103 |
| 8,424,174 B2 * | 4/2013 | Kikunaga et al. | ............ | 24/706.8 |

\* cited by examiner

*Primary Examiner* — Justin Larson
(74) *Attorney, Agent, or Firm* — William C. Yarbrough, III

(57) ABSTRACT

A spring-loaded receptacle designed to accept and reversibly link a stringer spike to an angler or watercraft to collect and combine fish. The sheath is a dual lumen device comprised of an outer tubular shell, a vertically movable, hollow inner stem, and a helical spring about the lower portion of the inner stem. The inner stem manifests three holes drilled at 120 degrees from one another and beads placed in these holes for engaging and securing the spike. A conically shaped bead deflector skirts the inner stem, surrounds the bead system, and exhibits a widening circumference as it descends into the outer shell. Spike insertion is accomplished by depressing the stem, compressing the spring, and allowing bead movement downward and outward away from the sheath center. The beads grip the spike when the stem is released, the spring expands, and the beads move into the bead deflector's tapered angle.

3 Claims, 5 Drawing Sheets

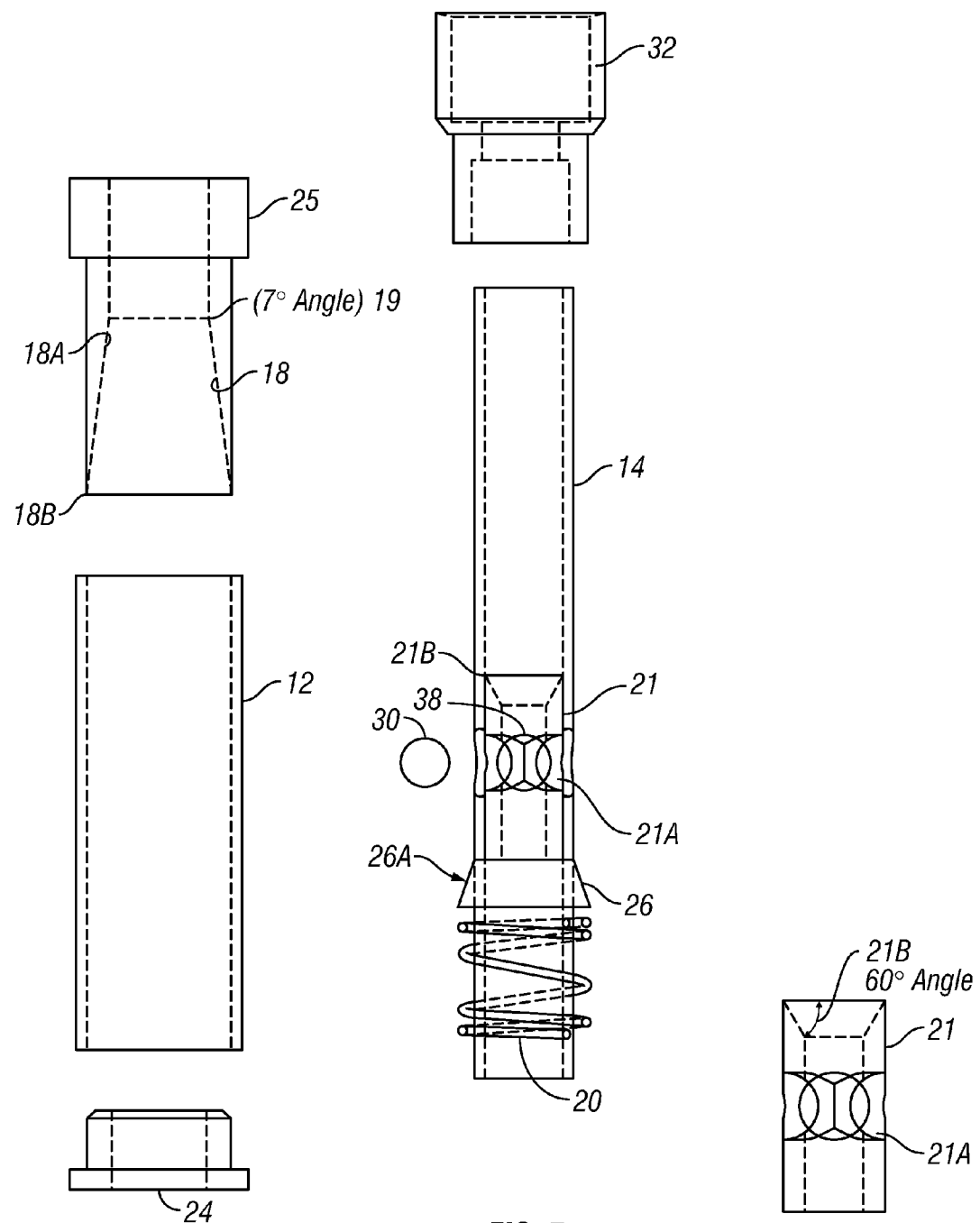

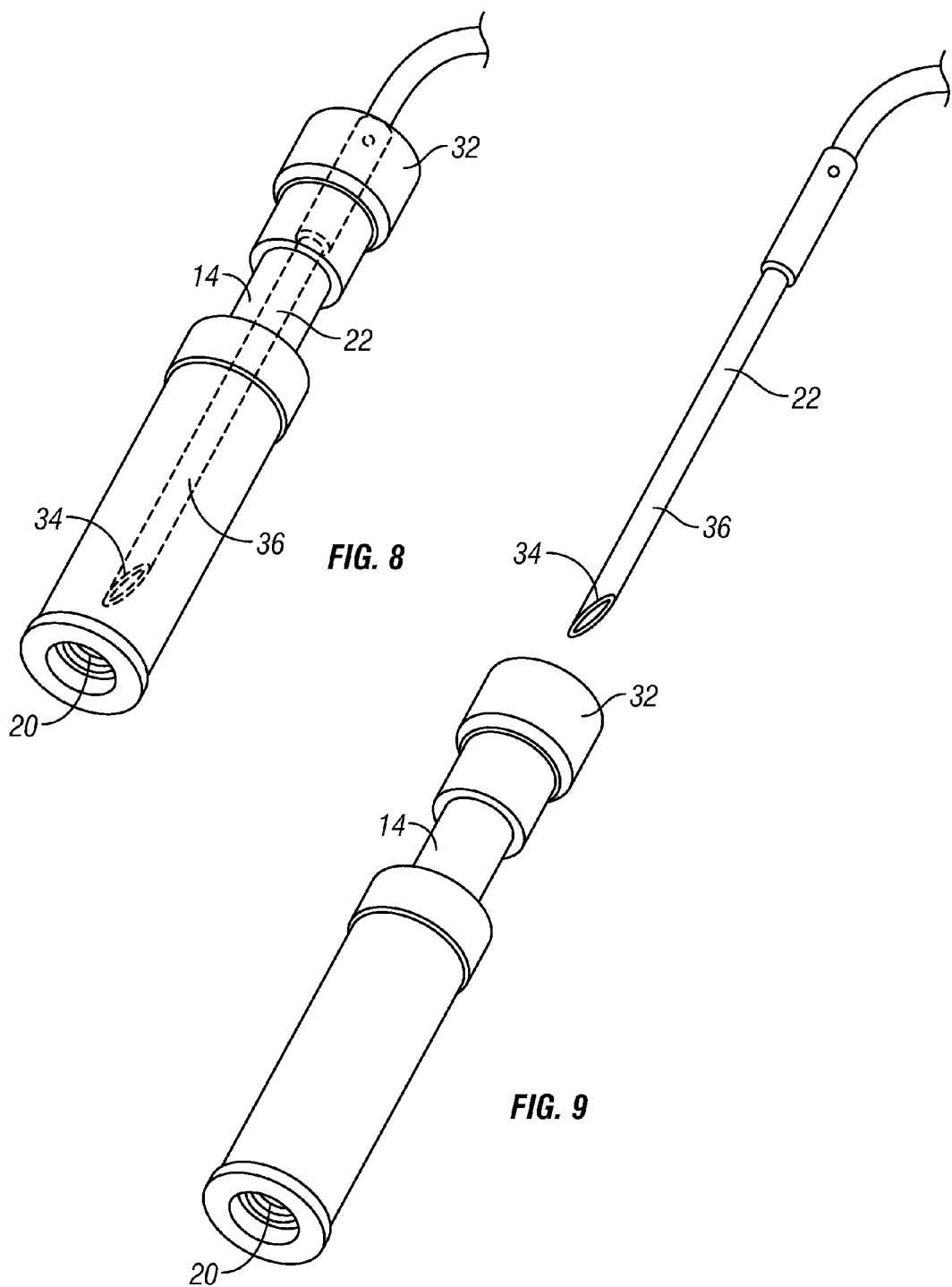

STRINGER SPIKE SHEATH

BACKGROUND OF THE INVENTION

1. Field of the Invention

The present invention relates to a fish stringing system, and more particularly, to an improved fish stringing system manifesting a point of connection between stringer and fisherman that allows for safe, reversible coupling, ease of fish attachment and detachment, and quick release.

2. Description of the Related Art

When in shore wade fishing for sport or leisure, it has long been customary to attach caught fish to ones self via a small line generally referred to as a stringer. This stringer may consist of a rope or cord exhibiting a plurality of hook closures for fish attachment or, as with this invention, a single piece of rope designed for successive fish attachment. In the later, once the fisherman has made his catch, the string is traditionally guided through the fish's gills and brought out of the mouth through the use of an attached beveled tip spike. Fish are collected in series and comprise what is commonly deemed a string of fish. To release the fish from the stringer, the fish are guided down the string and removed from the stringer.

While the material used in the construction of the stringer may vary, the fundamental assemblages have remained relatively consistent over time. The basic design of a fish stringer is a variable length of rope with a means to block the release of fish at one end of the rope in the form of a ring or float and a beveled spike at the rope end closest to the fisherman. In the most rudimentary design, an angler may simply attach a stringer to his or herself by tying the stringer to a belt or belt loop. Utilizing this method is undesirable in that it requires both hands to secure the stringer onto the fisherman. In addition, the exposed stringer spike presents a possible stabbing hazard. In an attempt to address both issues, fishermen in the past have attached a stringer spike to their person via a wade belt pocket, but even when wading belts or similar fishing attire are worn, the pockets made to receive the stringer spike may not be uniformly snug to all spike diameters and may not tightly grip the stringer spike. What is more, neither method of attachment allows for quick release of the stringer in the event a predator such as a porpoise or a shark attempts to abscond with the fisherman's catch. Additionally, should the fisherman be outfitted in chest high waders, the predator may drag the angler's feet from under him or her and allow the waders to fill with water—causing almost certain drowning.

Variations on the main theme have been developed, but no stringer system to date has had the capacity to reversibly couple to a stringer spike of varying diameters, allow for rapid release, and provide for the protection of the user from a stabbing hazard from an exposed, unsheathed beveled spike. The following patents are examples of improvements that answer some, but not all, of the concerns addressed by the current invention:

U.S. Pat No. 5,203,480, issued to Day, teaches a D-shaped fish stringer handle that contains an orifice to receive the stringer needle inherent in the device. The invention promotes safe sheathing of the stringer needle, but is not spring loaded for rapid attachment and release. Further, the Day patent requires greater manual dexterity in its operation than the present invention and necessitates a complex manipulation in securing the stringer needle inside the invention with the stringer rope itself.

U.S. Pat No. 5,025,587, issued to Creed, and U.S. Pat No. 4,830,244, issued to Brannon, both teach sheathed stringer attachment, yet neither is spring loaded for rapid release and both demand specific spike design in the mechanisms use.

U.S. Pat No. 5,078,310, issued to Ferry, employs a spring and plunger arrangement to secure a stringer rod. Yet, the stringer rod in Ferry's device runs perpendicular to the mechanism and exposes the beveled tip. The '310 invention does provide a tip cover to protect the fisherman from stabbing, however this cover forces another step in sheathing the stringer rod and increases the potential for possible stabbing either while attempting to cover the stringer rod or from a disassociated protective cap. In addition, the assembly is less esthetically appealing and less ergonomic than the present invention.

U.S. Pat No. 7,357,282, issued to Brull, describes a spring-loaded connector assembly capable of sheathing and reversibly coupling a stringer rod to a rod receptacle. While the invention sheaths the stringer rod and allows for quick release, the mechanism employed to secure the stringer rod relies on a groove around the circumference of the rod and a securing member that engages this groove to clutch the rod. Therefore, this system can only be utilized with a specific stringer rod exhibiting a set diameter and a specifically positioned groove.

U.S. Pat No. 4,570,836, issued to Mayo, as well utilizes a spring loaded system to sheath the stringer spike, but as in the previously mentioned '282 patent, the stringer spike relies upon a locking pin and specifically placed groove system to securely engage the spike. Additionally, even when the spike is sheathed, the stringer cord is still attached to the system and thus to the fisherman raising concerns of the operator's overall safety.

Clearly a need remains for a stringer attachment system that answers the aforementioned deficiencies. The present invention provides such an invention.

SUMMARY OF THE INVENTION

The present invention relates to a means to provide an improved fish stringing system that safely and securely sheaths a stringer spike of varying diameters and allows for the rapidly reversible attachment of a stringer spike to an angler for the purpose of collecting and combining fish. The stringer spike sheath is a dual lumen device comprising a tubular outer body shell that is capped at either end to house the internal mechanism. This internal mechanism includes an inner stem that moves vertically within the outer body shell and is spring loaded for spike to sheath coupling and release. The spring loaded mechanism consists of a helical spring residing within the lower portion of the outer shell and is made to wrap around the inner stem. This helical spring is set and bound on one end by a flanged spring stop encircling and affixed to the outer circumference of the stem and at the other end by a base cap. The inner stem manifests three 0.31 inch diameter holes that are drilled at 120 degrees approximately 2 inches from the outer shell base. Three spheres having a circumference only slightly less than each hole's diameter are placed in each of the three holes for the purpose of engaging and securing the spike. Surrounding the area of the inner stem harboring the three sphere system is an internal bead deflector machined to have a conical shape that causes the spheres to engage the spike when the spring is extended and taut and allows for the movement of the beads away from the spike and the release of the spike when the spring is compressed.

The present invention also provides for the attachment of a fish stringing system to a watercraft such as a boat or kayak.

One embodiment of the invention also allows for the securing of a watercraft itself to the shore, a boating dock, or another vessel via a spike and sheath system.

Another embodiment of the present invention provides a spike and sheath system for rapid attachment and detachment of watercraft rigging.

BRIEF DESCRIPTION OF THE DRAWINGS

FIG. 7—an exploded detailed view of outer shell, inner mechanism, and caps of FIG. 1;

FIG. 7a—an exploded view of the bead stop;

FIG. 8—an elevated perspective view depicting a sheathed spike;

FIG. 9—an elevated perspective view depicting an unsheathed spike; and

DETAILED DESCRIPTION OF THE PREFERRED EMBODIMENTS

Figure 1:
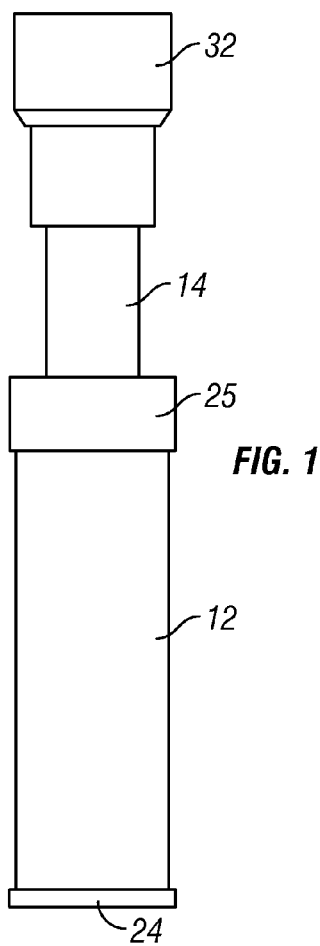
FIG. 1 is an assembled isometric front view of the present invention.

The following detailed description is of the best currently contemplated modes of carrying out exemplary embodiments of the present invention. The description is not to be taken in a limiting sense, but rather is made merely for the purpose of illustrating the general principles of the invention, since the scope of the invention is best defined by the appended claims and diagrams.

Broadly, one embodiment of the present invention provides a stringer spike sheath engineered for inshore wade fishing stringers which is designed to securely and reversibly receive a stringer spike of varying diameters for the purpose of accumulating fish on a stringer. As depicted in FIGS. 1 through 10, the device's outer shell 12 harbors a spring loaded inner stem 14 that incorporates a three-bead spike securing apparatus 16. Encircling the area of the three-beads 16 is a conically shaped bead deflector 18 that is tapered to a smaller diameter at the top 18A and widens at the base 18B. When the inner stem 14 is depressed and the helical spring 20 is made to contract, the stem's three beads 30 are free to move horizontally toward the bead deflector base 18B. This horizontal movement facilitates stringer spike 22 insertion and removal. Conversely, when the inner stem 14 is released and the helical spring 20 is taut, the beads 30 are forced to move toward one another due to the upward pressure of the helical spring 20 and the narrowing of the bead deflector 18A thus gripping an inserted stringer spike 22. The inner stem 14, in addition, serves a secondary function of protectively sheathing the inserted spike.

Figure 3:
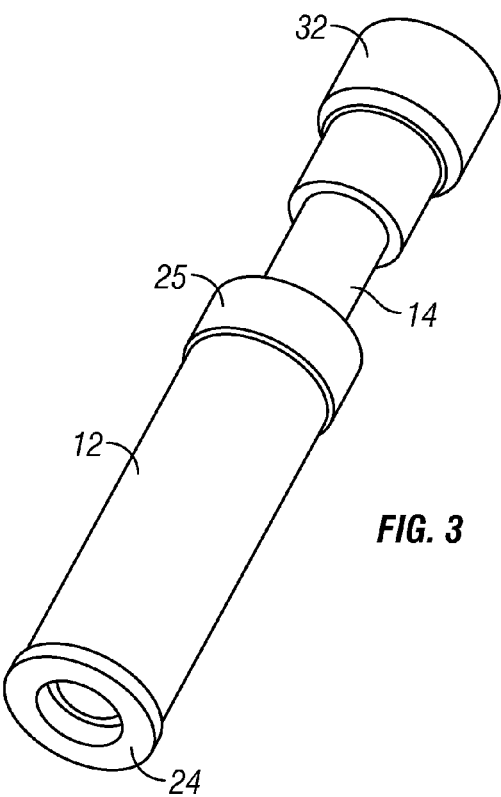
FIG. 3 is an isometric elevated perspective view of the present invention.
Figure 2:
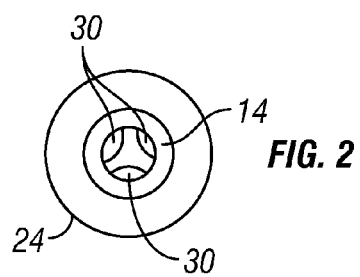
FIG. 2 illustrates the bottom view of the Stringer Spike Sheath of FIG. 1.
Figure 4:
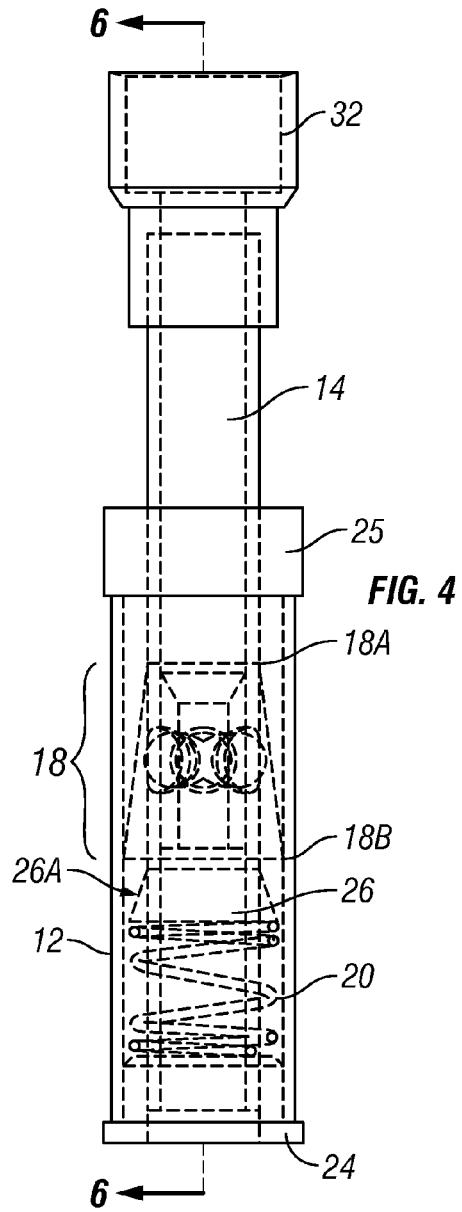
FIG. 4 is an assembled and detailed schematic front view and inner mechanism of FIG. 1.
Figure 6:
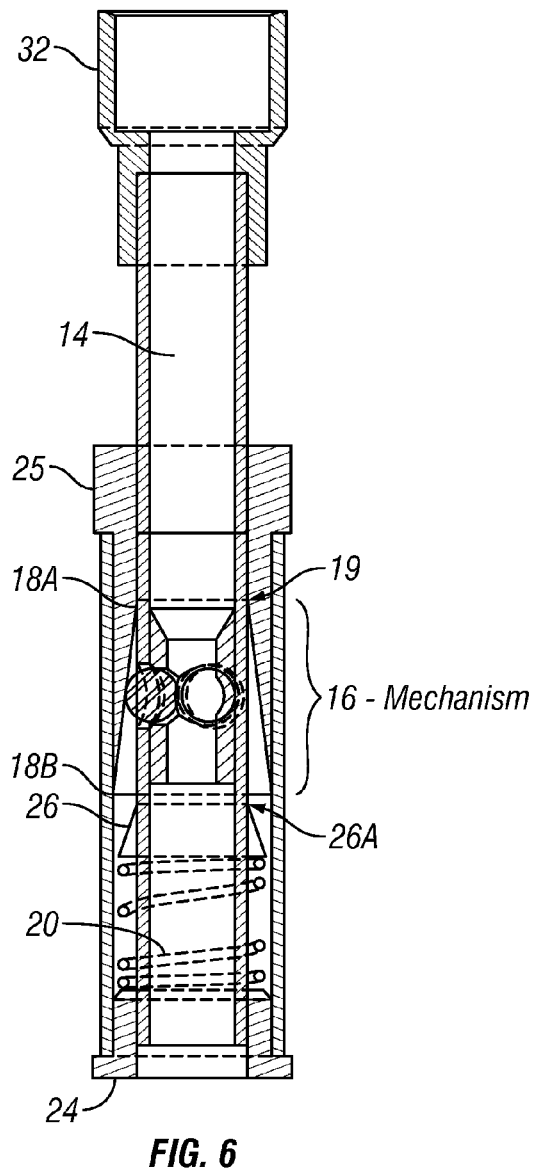
FIG. 6 is a cross sectional view of the STRINGER SPIKE SHEATH taken along line 6 of FIG. 4.
Figure 5:
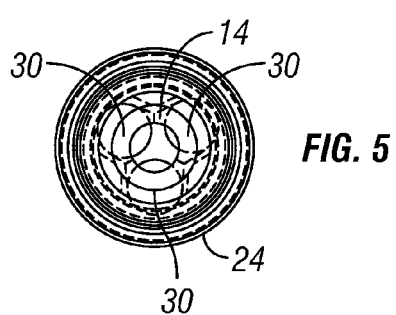
FIG. 5 is a detailed schematic bottom view of the inner mechanism of the Stringer Spike Sheath of FIG. 1.

FIG. 1-FIG. 3 illustrate one embodiment of the Stringer Spike Sheath. One embodiment of the Stringer Spike Sheath may be produced from corrosion resistant materials of polyvinyl chloride (PVC), stainless steel and/or brass. The outer body 12 may be a PVC tube that is approximately 3 inches in length and has an outer diameter that is approximately ¾ of an inch. The ends of the tube may be capped with two machined PVC pieces—a base cap 24 and a top cap 25 to maintain the working mechanism internally. Said top cap 25 may harbor a downward projecting bead deflector 18 (not depicted). Other embodiments may be formed from a mold that could be made to expedite the manufacturing process and make the device easier to assemble, more ergonomic, and/or more cosmetically appealing.

As illustrated in FIG. 4-FIG. 8, the outer shell 12 is book ended between the flanged base cap 24 and the flanged top cap 25 and is designed to contain the working inner mechanism 16 that represents the functional portion of the present invention. This internal mechanism 16 that may include a chlorinated polyvinyl chloride (CPVC) tube stem 14 may be approximately 4 and ¾ inches in length and have an outer diameter of approximately ½ of an inch. A spring stop 26 made from ½ inch PVC and machined at approximately a 19 degree angle 26A may be located approximately 1 and ½ inch from the base of the tube stem 14 and is made to encircle the circumference of the inner stem 14. Three 0.31 inch diameter holes 38 may be drilled 120 degrees apart into the inner stem 14 and located approximately 2 inches from the flanged base cap 24 just above the spring stop 26. To further stabilize the three bead system, said ball bearings 30 are held vertically restricted within the inner stem 14 by a bead stop 21 encapsulated within the inner stem 14. This bead stop exhibits drilled holes 21A identical in placement and diameter to the drilled holes in the inner stem 14. Made to sync with the inner stem drilled holes 38, the bead stop drilled holes 21A create a horizontal track for ball bearing 30 movement and may allow the ball bearings 30 to be installed permanently once the flanged base cap 24 and flanged top cap 25 are secured onto either end of the outer shell 12. An additional function of the bead stop 21 is depicted in FIG. 7a where the top portion of the bead stop 21 is a machined concave top surface 21B that serves to guide the beveled spike tip 34 into the bead stop 21 interior. While the aforementioned flanged base cap 24 is designed to seal the base of the Stringer Spike Sheath and abut spring 20, the flanged top cap 25 manifests an additional component—a downwardly projecting bead deflector 18. This conically shaped bead deflector 18, may be internally machined at such a 7 degree angle 19 where the inner upper most portion 18A exhibits a smaller diameter than the inner lower portion 18B and creates a circular skirt to guide the ball bearings 30 toward one another as the helical spring 20 expands. In order to allow the horizontally moveable ball bearings 30 to engage the stringer spike shaft 36 or similar inserted material, the inner stem 14 is depressed, the helical spring 20 is compressed, and the ball bearings 30 are allowed to move away from one another and the inner stem 14 center by moving to the expanded diameter of the bead deflector 18B. Once inserted, the stringer spike shaft 36 is engaged by the ball bearings 30 when the inner stem 14 is released, the helical spring 20 expands upwardly, and the ball bearings 30 are pushed to the narrow portion of the bead deflector by the upward force of the helical spring 20. Conversely, post insertion, the stringer spike 22, or other inserted material, may be correspondingly uncoupled from said Stringer Spike Sheath through subsequent inner stem 14 depression, spring 20 compression, and horizontal movement of said ball bearings 30 away from the Stringer Spike Sheath center and stringer spike shaft 36 facilitating an easy release.

Once the Stringer Spike Sheath is assembled, a ½ inch×¾ inch CPVC reducer/receiver cap 32 may be fixed to the top of the Stringer Spike Sheath tube stem 14 to allow entry of a spike 22 and serve as a push down release handle. The internal mechanism can move vertically inside the ¾ inch PVC outer body shell 12 and may be spring loaded.

FIG. 8 depicts a fully inserted stringer spike 22 into the Stringer Spike Sheath.

FIG. 9 is illustrative of an uncoupled system where the stringer spike 22 is unsheathed and uncoupled from the spike sheath.

Figure 10:
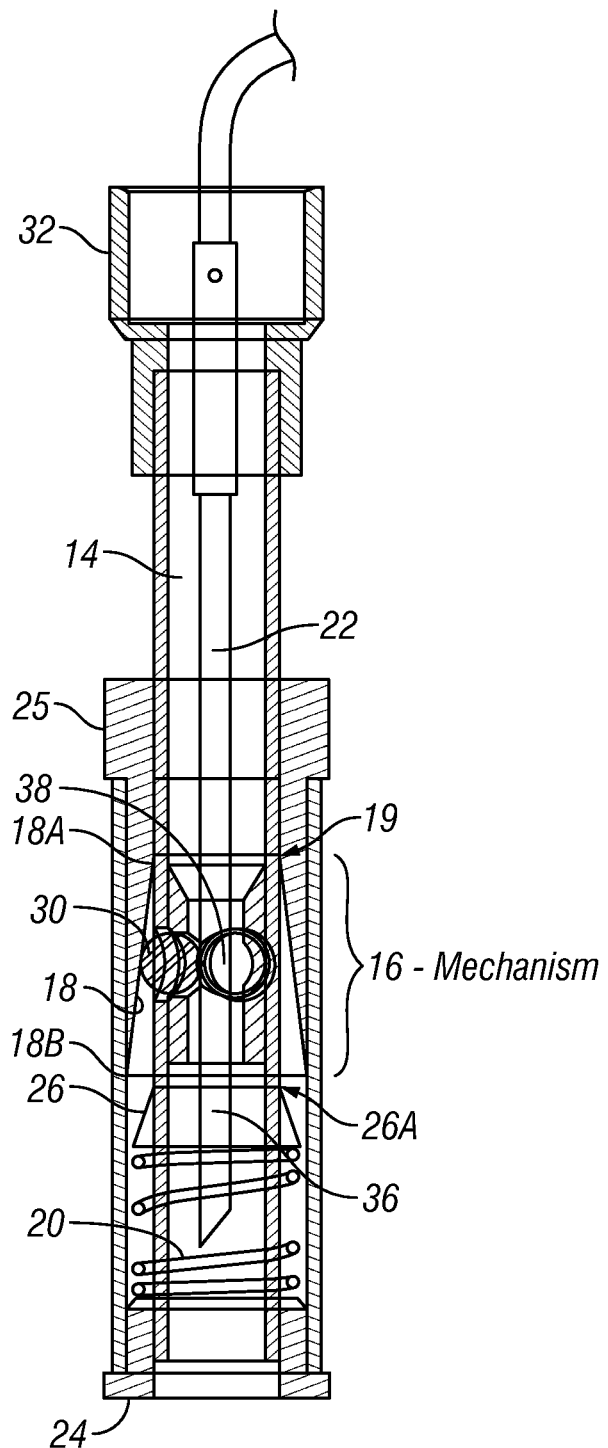
FIG. 10—a cross sectional view of the inner mechanism engaging the spike shaft.

FIG. 10 exemplifies a fully engaged inner mechanism 16 where the helical spring 20 is extended, the bearings 30 are forced into the narrow angle 18A of the bead deflector 18, and the bearings 30 engage the spike shaft 36.

To use the Stringer Spike Sheath, the tapered tip end 34 of the stringer spike 22 is inserted into the top of the Stringer Spike Sheath CPVC reducer/receiver cap 32 ultimately engaging the internal mechanism 16 through direct contact with the 3 ball bearings. The inner stem 14 is manually depressed vertically downward via increased pressure on the CPVC reducer/receiver cap 32. The downward movement of the inner stem 14 creates a corresponding pressure on the helical spring 20 to compress at the point of interface—the spring stop 26. The helical spring 20 become depressed, causing the deflection of the beads 30 away from one another and the mechanism center. When the spike 22 is fully inserted, the inner stem 14 is released, the helical spring 20 pushes back against the spring stop 26 thereby wedging the beads 30 between the spike shaft 36 and the uppermost portion of the bead deflector 18A. This force engages the spike shaft 36 and secures the spike 22 within the Stringer Spike Sheath. The illustrated embodiments of the Stringer Spike Sheath as in FIG. 8 may accommodate spikes having an outer diameter raging between ⅛ inch to ¼ inch. To release the spike 22 from the Stringer Spike Sheath, the user will simply push down on the receiver reducer 32 and inner stem 14, compressing the helical spring 20, allowing the beads to move away from the spike and towards the bead deflector base 18B. The inner stem 14 moves vertically downward within the outer shell and the beads 30 are sent horizontally away from the sheath center thus disengaging from the spike shaft 36. The spike 22, unencumbered, may then be easily removed from the Stringer Spike Sheath. Other embodiments may be assembled in a fashion that, instead of pushing down to release the spike, the user may pull up on the internal mechanism stem to release the spike or stringer material.

To make one embodiment of the Stringer Spike Sheath, a ¾ inch PVC tubing 12 can be cut to a length of 3 inches. Next ½ inch CPVC tubing ("the stem") 14 may be cut to a length of 4 and ¾ inches and three holes 38 having a diameter of approximately 0.31 inch may be drilled at 120 degree angles from one another at about 2 inches from one end. A machined PVC bead stop 21 exhibiting three drilled holes 21A matching the three drilled stem holes 38 is then machined at one end to create an inverse conical shape to facilitate spike 22 insertion through the bead stop 21 interior and past the bearings 30. This bead stop is permanently affixed into the ½ inch CPVC stem 14 and glued to align holes 12A with stem holes 38. A ½ inch diameter PVC ("the spring stop") 26 can then be cut to 0.25 inch long and belt sanded at approximately a 19 degree angle 26A which is then glued flat side down around the outside of the ½ inch CPVC stem, 1.5 inches from the same end that the holes were drilled. A machined PVC cap 24 can then be glued to one end of the ¾ inch PVC tubing 12 and set to dry. Once dry, the helical spring 20 is then inserted into the ¾ inch PVC tubing base (abutting the cap) and the ½ inch CPVC internal assembly is inserted into the helical spring 20 causing the helical spring 20 to be sandwiched between the PVC base cap 24 and the inserted ½ inch CPVC inner stem spring stop 26 leaving just enough room to install 3 brass beads 30 into the drilled holes 38 and 21A. After the beads 30 are installed and the inner stem 14 is inserted into the outer body PVC shell 12, a second machined flanged PVC cap 25 containing a downwardly projecting bead deflector 18 may be glued to the outer body PVC shell 12 most proximal to spike insertion and set to dry. Finally a cup shaped PVC reducer 32 may be glued on top of the ½ inch CPVC inner stem 14 to facilitate ease of spike insertion.

On a larger physical scale, a similar mechanism may be used as a boat anchor mooring system. In this example, a spike on the end of an anchor rope could be used as a quick release anchor system.

In yet another marine application the spike and sheath system could be used in a boat mooring system providing for quick release capability from another vessel, a boat dock, or shore.

On a smaller or larger scale, the spike and sheath system may have value as a securing mechanism for sea vessel or boat riggings.

It should be understood, of course, that the foregoing relates to exemplary embodiments of the invention and that modifications may be made without departing from the spirit and scope of the invention as set forth in the following claims.

What is claimed is:

1. A stringer spike sheath comprising:
   an outer tube for encasing and securing an inner stringer spike grasping mechanism;
   an "O" shaped end cap for sealing the bottom end of the outer tube and serving as a lower spring stop for a helical spring;
   an "O" shaped end cap for sealing the top end of the outer tube exhibiting a downward projecting tubular bead deflector;
   said tubular bead deflector machined to reveal an inner conical shape tapered at the point closest to spike insertion and widening as it descends into said outer tube;
   an inner tube stem comprising at least 3 drilled holes to accommodate 3 beads of slightly lesser diameter than said holes;
   said inner tube stem incorporating a inner bead stop;
   a receiver cap atop said inner tube stem having a circumference slightly greater than said inner tube stem at the point of attachment to said stem and circumference roughly equal to the circumference of said outer tube at the point of spike insertion;
   a spring stop about the circumference of the inner tube at some distance below the drilled holes serving as an upper spring stop;
   a helical spring disposed of at the bottom end of the outer tube abutted at either end by said "O" shaped end cap and said spring stop and coiled around said inner tube stem;
   and at least three beads, wherein the beads are accommodated by the 3 drilled holes;
   wherein the inner tube is for receiving a stringer spike where said beads are pressed against said spike due to the force of said spring when fully extended and narrowing of the bead deflector diameter and are made to release said spike when the inner tube is depressed, the bead deflector diameter broadens, tension on the beads is reduced, and the spike may be withdrawn.

2. A spike sheath of claim 1, wherein said sheath is manufactured on a larger scale and is used for the mooring and/or docking of watercraft.

3. A spike sheath of claim 1, wherein said sheath is manufactured on a smaller or larger scale in use with watercraft rigging.

* * * * *